United States Patent Office 2,945,009
Patented July 12, 1960

2,945,009

OXALYL DIIMINO BIS(2,2-DIMETHYL ACETIC ACID), ESTERS AND CONDENSATION POLYMERS

John R. Caldwell and Clarence C. Dannelly, Kingsport, Tenn., assignors to Eastman Kodak Company, Rochester, N.Y., a corporation of New Jersey No Drawing. Filed Oct. 1, 1956, Ser. No. 612,987

5 Claims. (Cl. 260—75)

This invention relates to the free acid and dialkyl esters of 2,2'-oxalyldiminobis(2,2-dimethylacetic acid), to a process for their preparation, to their use in preparing linear condensation polymers and to the polymers produced. The polymers can be formed into valuable coating materials, molding compositions, films and fibers useful for fabrics, etc.

The prior art as illustrated by U. S. 2,356,702 describes various polymers prepared by condensing compounds such as

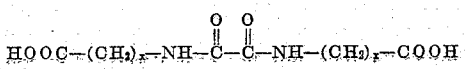

with various glycols. However, the prior art has recognized that $x$ should be at least 5. It was believed that when $x$ is smaller than 5 these compounds cannot be usefully employed to produce polymers. For example,

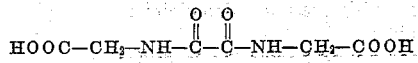

which can be formed by reacting the sodium salt of glycine with diethyl oxalate as described in Ber. 30, 580 (1897), cannot be condensed with glycols to give a polymer under the conditions such as described in Example 2 set forth below. Attempts to do so produced a black color during the early stages of the reaction and no polymer was obtained.

When the oxamide derivative of 4-amino-butyric acid, namely,

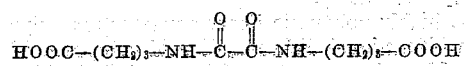

was employed under the conditions described in Example 2 set forth below, it also would not condense with glycols and the reaction product was found to contain only 0.23% nitrogen compared to the theoretical value of 3.3% which would be expected if the condensation had taken place.

In view of the prior art it would not be expected that a useful polymer could be obtained from an isomer of that compound of the general formula given above where $x$ is 3.

Moreover, the literature as cited above (Ber. 30, 580) states that α-alanine could not be reacted to form a condensation product with diethyl oxalate although glycine did react. It would appear that the reaction would not proceed because the amino group in α-alanine is on a secondary carbon atom.

It was therefore quite unexpected to discover that the ethyl ester of 2-amino-2-methylpropionic acid (which is a derivative of glycine) could be condensed with diethyl oxalate to form the ethyl ester of 2,2'-oxalyldiiminobis-(2,2-dimethylacetic acid).

It is an object of this invention to provide new chemical compounds which include 2,2'-oxalyldiiminobis(2,2-bismethylacetic acid) and dialkyl esters thereof.

It is another object of this invention to provide new highly polymeric condensation polymers prepared by reacting one or more of these new compounds with a dialkyl ester of oxalic acid, which polymers are useful for film fibers, fabric, molding compositions, coating materials and the like.

Other objects will become apparent hereinafter.

According to a principal embodiment of this invention there is provided a compound having the formula:

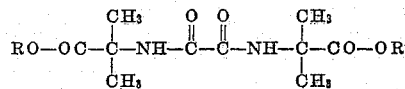

wherein R represents a member selected from the group consisting of a hydrogen atom and an alkyl radical containing from 1 to 8 carbon atoms.

According to another embodiment of this invention there is provided a process comprising reacting, at an elevated temperature under conditions such that the alkyl alcohol being formed is evaporated, approximately two mole proportions of

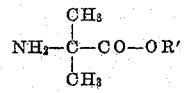

together with one mole proportion of

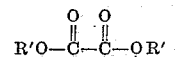

wherein each R' represents an alkyl radical containing from 1 to 8 carbon atoms so as to produce

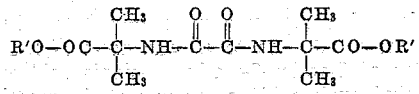

In accordance with another principal embodiment of this invention there is provided a highly polymeric linear condensation polymer substantially comprising recurring structural units having the following formula:

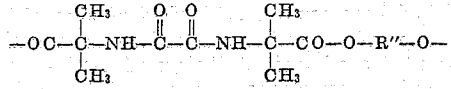

wherein R" represents the dehydroxylated residue of a bifunctional glycol containing from 2 to 12 carbon atoms (straight or branched chain).

According to another embodiment of this invention there is provided in a process for preparing a highly polymeric linear condensation polymer by reacting a bifunctional dicarboxylic compound with a bifunctional glycol containing from 2 to 12 carbon atoms at an elevated temperature in the presence of a condensing agent under an inert atmosphere employing a greatly reduced pressure toward the end of the reaction, the improvement consisting of the employment of a lower alkyl ester of 2,2'-oxalyldiiminobis (2,2-dimethylacetic acid) as a substantial proportion of the said bifunctional dicarboxylic compound (includes aliphatics and aromatics).

The various esters referred to herein include those well known alkyl esters wherein the alkyl radicals are generally derived from alcohols containing from 1 to 8 carbon atoms such as methyl, ethyl, n-propyl, isopropyl, n-butyl, tert. butyl, amyl, tert. amyl, 2-ethylhexyl, tert. octyl, n-octyl, etc. Of course higher alcohols can be similarly employed under appropriate circumstances.

The reaction conditions contemplated in forming the monomeric starting material are similar to those described in the cited literature and involve the employment of conventional apparatus and chemical techniques readily apparent to those skilled in the art which are apropos to this type of condensation reaction wherein the volatile byproduct is removed by evaporation into a suitable condenser which effects its separation from the desired reaction product, e.g. see Example 1 hereinbelow. The end of the reaction can be conveniently determined by measuring the amount of byproduct which is separated, i.e. an alcohol. Obviously, it is most convenient to employ an alkyl ester producing an alcohol having a boiling point at a temperature which permits the employment of simple apparatus and requires a reasonably short reaction time. Most advantageously, the ethyl esters are employed.

The employment of these monomeric starting materials in preparing condensation polymers such as polyesteramides is carried out in accordance with those well known techniques such as have been described in U.S 2,356,702, U.S. 2,130,523, U.S. 2,130,948, U.S. 2,245,129, U.S. 2,500,317, U.S. 2,752,328 and many other U.S. patents. There is nothing to be gained herein by elaborating upon the conditions employed, the apparatus used or the techniques involved since the contribution of the present invention relates to the employment of new starting materials as described herein. Examples 2 and 3 hereinbelow adequately illustrate this embodiment of the invention. Generally, at least 25 mole percent of the recurring structural units in the preferred polymers have the formula depicted above. Most advantageously these recurring structural units comprise from about 25 to about 80 mole percent of the polymer.

This invention can be further illustrated by the following examples of preferred embodiments although it will be understood that these examples are included merely for purposes of illustration and are not intended to limit the scope of the invention unless otherwise specifically indicated:

*Example 1*

The following reactants were mixed together in a reaction vessel attached to a condenser: 100 g. of the ethyl ester of 2-amino-2-methylpropionic acid and 55.5 g. of diethyl oxalate. The contents of the reaction vessel was heated to approximately 120° C. under conditions such that the ethyl alcohol formed was removed from the reaction mixture. Heating was continued until approximately all of the theoretical quantity of ethyl alcohol had been removed. A yield of about 70–80% was obtained of the diethyl ester of 2,2′-oxalyldiiminobis-(2,2-dimethyl acetic acid). This product was recrystallized from isopropyl alcohol. It had a M.P. of 91°–92.5° C. and elemental analysis showed nitrogen 8.77% compared to the theoretical 8.86%. A portion of this ester was hydrolyzed employing sulfuric acid as a catalyst thereby forming the free acid.

*Example 2*

10 g. of dimethyl terephthalate, 7.7 g. of 2,2′-oxalyldiiminobis(2,2-dimethylacetic acid) diethyl ester, 14 g. of butanediol-1,4, and 0.01 g. titanium butoxide were placed in a vessel equipped with a stirrer, a distillation column, and an inlet for nitrogen gas. The mixture was stirred at 190–200° C. in an atmosphere of nitrogen and a mixture of methyl and ethyl alcohols was removed through the column. After the evolution of alcohol had practically stopped, the temperature was raised to 220° C. and held for 30 minutes. A vacuum of 0.1 mm. was then applied and the melt was stirred at 220° C. for 2 hours. A high viscosity melt was obtained. The product had an inherent viscosity of 0.61 as measured in a solvent consisting of 60 cresol-40 tetrachloroethane. It contained 3.4% nitrogen, as compared with a theoretical value of 3.3% N. The high viscosity and nitrogen content of the product show that the amino acid derivative was stable and remained in the polymer.

*Example 3*

Using the general procedure described in Example 2, a polymer was made from 2 moles of 2,2′-oxalyldiiminobis(2,2-diemthylacetic acid), 1 mole of 4,4′-sulfonyldibenzoic acid, and tetramethylene glycol. The product had an inherent viscosity of 0.65 and a nitrogen content of 5.3% as compared with a theoretical value of 5.7%. The polyester-amide softened at 230–240° C. and gave fibers that dyed well with cellulose acetate dyes, premetallized dyes, acid wool dyes, and some direct cotton dyes.

The polymers of Examples 2 and 3 were formed into films which were biaxially stretched and heat-set. These films were excellent wrapping materials, electrical insulators, and could be used for many other purposes for which films of this type can be employed, e.g. as a support for photographic emulsions of either the color or black-and-white types. The use of these polymers in fibers has been mentioned above. Oriented heat-set fibers of these polymers can be formed into yarns, threads, ropes, tire cord, fabrics of the woven or unwoven types, etc. They are characterized by excellent dyeability and overall good qualities, especially when employed in blends or copolymers with other known polymeric materials of desirable film-forming or fiber-forming utility.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A compound having the formula:

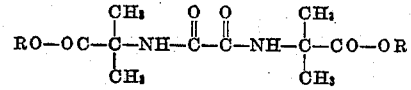

wherein R represents a member selected from the group consisting of a hydrogen atom and an alkyl radical containing from 1 to 8 carbon atoms.

2. The diethyl ester of 2,2′-oxalyldiiminobis(2,2-dimethylacetic acid).

3. A highly polymeric linear condensation polymer of (A) a bifunctional dicarboxylic acid composed of from 25 to 80 mole percent of 2,2′-oxalyldiiminobis(2,2-dimethylacetic acid) and (B) a bifunctional aliphate glycol containing from 2 to 12 carbon atoms.

4. A polymer as defined in claim 3 of (A) 2,2′-oxalyldiiminobis(2,2-dimethylacetic acid) and terephthalic acid as the bifunctional dicarboxylic acids and (B) tetramethylene glycol as the bifunctional glycol.

5. A polymer as defined in claim 3 of (A) 2,2′-oxalyldiiminobis(2,2-dimethylacetic acid) and 4,4-sulfonyldibenzoic acid as the bifunctional dicarboxylic acids and (B) tetramethylene glycol as the bifunctional glycol.

References Cited in the file of this patent

J.A.C.S., 75, pages 3413–17 (1953), article by Southwick.

UNITED STATES PATENT OFFICE
CERTIFICATE OF CORRECTION

Patent No. 2,945,009                              July 12, 1960

John R. Caldwell et al.

It is hereby certified that error appears in the printed specification of the above numbered patent requiring correction and that the said Letters Patent should read as corrected below.

Column 1, line 16, for "2,2'-oxalyldiminobis(2,2-dimethylacetic acid)" read -- 2,2'-oxalyldiiminobis(2,2-dimethylacetic acid) --; column 4, line 51, for "aliphate" read -- aliphatic --.

Signed and sealed this 4th day of April 1961.

(SEAL)
Attest: ERNEST W. SWIDER

~~XXXXXXXXXX~~
Attesting Officer

ARTHUR W. CROCKER
                                                 Acting Commissioner of Patents